United States Patent Office 3,781,439
Patented Dec. 25, 1973

3,781,439
PHARMACEUTICAL COMPOSITION HAVING ANALGESIC AND ANTIPHLOGISTIC ACTIVITIES
Giorgio Zoni, Milan, Italy, assignor to Italfarmaco S.p.A., Milan, Italy
No Drawing. Filed Feb. 25, 1971, Ser. No. 118,938
Claims priority, application Italy, Dec. 15, 1970, 33,026/70
Int. Cl. A61k 27/00
U.S. Cl. 424—273                               5 Claims

ABSTRACT OF THE DISCLOSURE 1-(m-trifluoromethylphenyl)-3-hydroxy-1H-indazole of the formula:

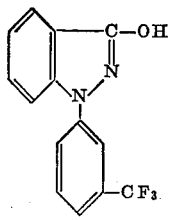

as well as pharmaceutical compositions containing it as the active ingredient have been found to have analgesic and antiphlogistic activities

---

This invention relates to a pharmaceutical composition having analgesic and antiphlogistic activities, which contains as the active ingredient 1-(m-trifluoromethylphenyl)-3-hydroxy-1H-indazole of the formula

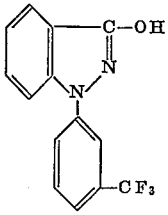

1-(m - trifluoromethylphenyl)-3-hydroxy-1H-indazole, which will be referred to hereinafter, for the sake of brevity, as ITF 614 can be made, for instance, by reducing N - nitroso-N-(m-trifluoromethylphenyl)-anthranilic acid with zinc and acetic acid as described in Bollettino di Chimica Farmaceutica, 107, p. 603 (1968).

ITF 614, although already known as intermediate for preparing dialkylaminoalkoxy-indazoles having pharmacological properties, had never been considered previously as to the biological point of view. The fact that said compound shows very interesting antiphlogistic and analgesic properties is surprising, since it is known that the 3-hydroxy-indazoles having similar structures are of no importance in this respect.

The therapeutical characteristics of ITF 614 can be stressed by the following tests, wherein Wistar-strain rats of both sexes having corporeal weights of from 160 to 190 g. and CF-1-strain male mice having corporeal weights of from 19 to 22 g. were used.

The tested products were always administered orally, through a gastric probe, the products being finally suspended in a 0.25% aqueous solution of Methocel 65/400 DG.

The $ED_{50}$ and $LD_{50}$ as well as the related reliance limits were determined in accordance with the method of Litchfield and Wilcoxon, J. Pharm. Exp. Therap., 96 (1949).

(1) INHIBITION OF THE DEVELOPMENT OF THE CARRAGEENIN-INDUCED OEDEMA IN THE RAT.

Female rats having corporeal weights of 160 to 180 g. were used. These animals were kept fasting for 18 hours before the beginning of the tests.

The substances were administered 60 min. before the injection of 0.1 ml. of a 1% aqueous solution of carrageenin in the plantar zone of the rear right paw. Immediately after said carrageenin injection, 4 ml. water were administered orally to each of the rats.

The volume of the paw was determined just after the carrageenin injection and 2, 3 and 4 hours thereafter, by using a differential volume gauge. The volume increase of the oedema-affected paw was determined in the pretreated rats in comparison with that of the control rats.

TABLE I.—INHIBITION OF THE DEVELOPMENT OF THE CARRAGEENIN-INDUCED OEDEMA IN THE RAT

| Products | Dose mg./kg. per os | Number of animals | Volume increase of the paw in ml. plus SE at— | | | Percent inhibition (maximum) | Approximate equiactive doses, mg./kg. |
|---|---|---|---|---|---|---|---|
| | | | 120 min. | 180 min. | 240 min. | | |
| Control | | 10 | 1.20±0.06 | 1.32±0.05 | 1.29±0.10 | | |
| ITF 614 | 10 | 10 | 1.17±0.08 | 1.27±0.08 | 1.27±0.06 | 3.7 | 40 |
| | 20 | 10 | 1.05±0.07 | 1.20±0.09 | 1.21±0.09 | 12.5 | |
| | 40 | 10 | 0.71±0.04 | 1.08±0.10 | 1.10±0.09 | 40.8 | |
| | 80 | 10 | 0.54±0.03 | 0.81±0.10 | 0.91±0.10 | 55.0 | |
| Control | | 10 | 0.99±0.09 | 1.32±0.10 | 1.34±0.09 | | |
| Fluophenamic acid | 20 | 10 | 0.73±0.07 | 0.85±0.05 | 0.99±0.04 | 35.6 | 25 |
| | 40 | 10 | 0.56±0.04 | 0.63±0.06 | 0.77±0.06 | 52.3 | |
| | 80 | 10 | 0.33±0.03 | 0.46±0.06 | 0.65±0.07 | 65.0 | |
| Control | | 10 | 1.12±0.05 | 1.22±0.08 | 1.34±0.08 | | |
| Benzidamine hydrochloride | 20 | 10 | 1.02±0.03 | 1.11±0.05 | 1.26±0.05 | 9.0 | 70 |
| | 40 | 10 | 0.78±0.09 | 0.91±0.10 | 1.10±0.06 | 30.3 | |
| | 80 | 10 | 0.59±0.03 | 0.80±0.05 | 1.02±0.07 | 47.3 | |

¹ SE=standard error.

From the data of Table I, the striking inhibiting action of ITF 614 on the carrageenin-induced oedema can clearly be seen. Said action can be compared with that of fluophenamic acid and of benzidamine.

(2) INHIBITION OF THE DEVELOPMENT OF GRANULOMATOUS TISSUE IN THE INTEGRAL AND SUPRARENALECTOMIZED RAT

This test was effected in accordance with the method described by R. Mayer et al. in Experientia 6, 469 (1950).

Male, Wistar-strain rats having corporeal weights of from 160 to 180 g. were used.

The tests were carried out on the above rats by subcutaneously implanting in the right and left scapular zones a pair of sterile, compressed cotton pellets which had been obtained by slicing discs from "dental rolls." Each of the pellets had a weight of from 19 to 21 mg. and had been sterilized for 1 hour at 150° C.

In order to ascertain whether an antiphlogistic effect has to be ascribed or not to a suprarenal stimulation, suprarenalectomized rats have also been used for implanting the cotton pellets, which rats were fed with a hypersodic diet.

In each case the products were administered daily for a total of six days and the animals were killed 24 hours after the last administration.

The granulomatous tissue which formed around the cotton pellets was withdrawn, dried at 70° C. for 12 hours and weighed; of course, the weight of the cotton was considered and subtracted from the weight of the tissue.

The control animals were always fed with distilled water only.

according to which a 0.5% solution of acetic acid is injected i.p. in the amount of 10 ml./kg. The analgesic activity was determined on the basis of the number of the induced writhings.

The capillary permeability was evaluated on the basis of the amount of Evans Blue, which was administered i.v. (5 ml./kg. in a 2% solution) five minutes before the injection of acetic acid. The dye was colorimetrically titrated in the peritoneal liquor fifteen minutes after the injection of the phlogosis-inducing agent.

TABLE II.—INHIBITION OF THE DEVELOPMENT OF GRANULOMATOUS TISSUE INDUCED BY IMPLANTING COTTON PELLETS IN INTEGRAL RATS

| Products | Dose, mg./kg./day per os | Number of animals | Weight (mg.) of the granulomatous tissue±SE | Percent inhibition |
|---|---|---|---|---|
| Control | | 12 | 59.1±3.04 | |
| ITF 614 | 10 | 10 | 49.5±2.81 | 16.2 |
| | 20 | 10 | 46.2±2.48 | 21.8 |
| | 40 | 10 | 44.0±3.02 | 25.5 |
| | 80 | 20 | 48.7±2.27 | 34.4 |
| Control | | 12 | 59.1±3.04 | |
| Fluophenamic acid | 10 | 10 | 49.9±4.86 | 15.5 |
| | 20 | 10 | 47.5±2.64 | 19.6 |
| | 40 | 20 | 43.5±3.44 | 26.3 |
| Control | | 12 | 67.0±3.62 | |
| Benzidamine hydrochloride | 20 | 10 | 63.0±4.68 | 5.9 |
| | 40 | 10 | 52.8±3.91 | 21.1 |
| | 80 | 10 | 47.4±1.41 | 29.1 |

TABLE III.—INHIBITION OF THE DEVELOPMENT OF GRANULOMATOUS TISSUE INDUCED BY IMPLANTING COTTON PELLETS IN SUPRARENALECTOMIZED RATS

| Products | Dose, mg./kg./day per os | Number of animals | Weight (mg.) of the granulomatous tissue±SE | Percent inhibition |
|---|---|---|---|---|
| Control | | 10 | 66.4±2.38 | |
| ITF 614 | 10 | 10 | 59.4±2.46 | 10.5 |
| | 20 | 10 | 56.0±2.84 | 15.6 |
| | 40 | 10 | 52.6±2.63 | 20.7 |
| Control | | 10 | 56.4±2.81 | |
| Fluophenamic acid | 10 | 10 | 52.4±3.12 | 7.0 |
| | 20 | 10 | 45.8±2.42 | 18.8 |
| | 40 | 10 | 44.2±2.26 | 21.6 |
| Control | | 10 | 40.1±3.25 | |
| Benzidamine hydrochloride | 20 | 10 | 54.3±2.84 | 9.6 |
| | 40 | 10 | 48.9±2.66 | 18.6 |
| | 80 | 10 | 41.0±1.80 | 31.4 |

From the data of Tables II and III, the inhibiting action of ITF 614 on the development of granulomatous tissue can clearly be seen.

The products to be tested were administered thirty minutes before the injection of acetic acid.

TABLE IV.—ANALGESIC ACTIVITY AND EFFECT ON THE PERITONEAL CAPILLARY PERMEABILITY IN THE MOUSE

| Products | Number of animals | Dose, mg./kg. per os | Number of writhings ±SE | Percent inhibition | Mg. Evans Blue per mouse±SE | Percent inhibition | Writhings, ED$_{50}$ (C.L.), mg./kg. | Permeability, approx. ED$_{50}$ (mg./kg.) |
|---|---|---|---|---|---|---|---|---|
| Control | 10 | | 32.8±4.24 | | 42.8±3.15 | | | |
| ITF 614 | 10 | 10 | 17.0±4.52 | 48.0 | 36.0±5.22 | 15.9 | 9.2 (3.28–25.76) | 60 |
| | 10 | 20 | 10.6±3.02 | 67.6 | 34.2±3.58 | 20.1 | | |
| | 10 | 40 | 8.6±2.40 | 73.9 | 26.3±4.07 | 38.5 | | |
| Control | 10 | | 44.2±2.49 | | 37.4±5.96 | | | |
| Fluophenamic acid | 10 | 10 | 32.7±6.10 | 26.0 | 38.1±4.70 | 0 | 28 (12.7–61.6) | 60 |
| | 10 | 20 | 26.1±3.28 | 41.0 | 34.7±4.34 | 7.2 | | |
| | 10 | 40 | 18.3±3.19 | 58.5 | 25.6±6.08 | 31.6 | | |
| Control | 10 | | 37.3±3.06 | | 54.2±4.15 | | | |
| Benzidamine hydrochloride | 10 | 20 | 23.9±3.45 | 35.9 | 43.3±5.77 | 20.1 | 30.5 (17.4–53.37) | 70 |
| | 10 | 40 | 15.4±6.34 | 58.7 | 36.9±6.31 | 31.9 | | |
| | 10 | 80 | 7.5±5.18 | 80.0 | 25.6±8.03 | 52.9 | | |

(3) ANALGESIC ACTIVITY AND EFFECT ON THE PERITONEAL CAPILLARY PERMEABILITY IN THE MOUSE

A "writhing test" induced in the mouse by an i.p. injection of acetic acid was used. This test also allows, as described by Whittle, Brit. J. Pharmacol., 22, 246 (1964), at the same time, a study on the modification produced by the tested substances on the peritoneal capillary permeability, which has been altered by the i.p. injection of acetic acid.

In these tests, the procedure described by Arrigoni-Martelli, Boll. Chim. Farm., 107, 29 (1968) was used, From the data of Table IV, the higher activity of ITF 614 with respect to those of fluophenamic acid and of benzidamine can be seen.

(4) ANALGESIC ACTION IN THE RAT

In these tests, male rats having corporeal weights of from 170 to 190 g. were used, which had been kept fasting for 18 hours but fed with water at will.

The analgesic action was quantitatively determined in accordance with the method described by Randall and Selitto, Arch. Int. Pharmacodyn., 111, 409 (1957). In this procedure, the analgesic activity was measured on the basis of the increase of the algogenic threshold, which latter was determined by applying a uniformly increasing pressure on the rear plantar zone in which an oedema had been previously induced by a topical injection of 0.1 ml. of a 20% brewer's yeast suspension in distilled water.

In order to better define the kind of the analgesic action, particularly in order to determine whether said action can be related to an antiphlogistic action, the algogenic threshold was determined, at the same time, on the normal, contralateral paw.

The algogenic threshold determinations were effected thirty minutes before administering the products and 60, 120 and 180 minutes thereafter. The brewer's yeast suspension had been injected into the plantar zone of the paw sixty minutes before the first determination of the algogenic threshold.

(5) EFFECTS ON THE BEHAVIOR OF THE MOUSE

In these tests male CF-1 mice were used, which had a weight of from 19 to 21 g. and had been kept fasting for 18 hours.

The products to be tested were administered orally in various doses to groups of five mice per each dose level.

Doses of 10, 30, 60, 100, 300, 600 and 1000 mg./kg. were used.

The modification of the behavior of the tested animals was observed in accordance with the method of Irwin, Gordon Res. Conf. Med. Chem.—New London, N.H., 3/7-8, p. 133 (1959) during the first 4 hours after the administration of the products and, thereafter, daily for 5 days. The immediate mortality rate and that which occurred during the five days after the treatment were also determined.

TABLE V

Analgesic action in the rat—normal paw

| Products | Dose, mg./kg. per os | Number of animals | Algogenic threshold in arbitrary units±SE | | | | Maximum increase, percent |
|---|---|---|---|---|---|---|---|
| | | | 30 min. before | Time in min. from the treatment at— | | | |
| | | | | 60 min. | 120 min. | 180 min. | |
| ITF 614 | 10 | 10 | 14.7±1.33 | 14.6±1.19 | 14.7±0.90 | 14.5±0.74 | 0 |
| | 20 | 20 | 12.7±1.04 | 13.4±1.44 | 12.7±1.10 | 14.1±1.34 | 16.5 |
| | 40 | 20 | 12.45±0.68 | 14.9±1.09 | 14.2±0.87 | 14.3±0.86 | 20.2 |
| | 80 | 10 | 12.9±1.16 | 12.9±0.92 | 13.4±1.43 | 12.4±1.25 | 3.8 |
| Fluophenamic acid | 10 | 10 | 18.4±1.57 | 20.5±1.22 | 15.6±1.46 | 17.0±1.29 | 11.4 |
| | 20 | 10 | 19.0±1.17 | 18.9±1.46 | 19.4±1.54 | 18.7±1.61 | 2.1 |
| | 40 | 10 | 15.2±1.60 | 15.2±1.24 | 17.2±0.70 | 14.6±1.35 | 13.0 |
| Benzidamine hydrochloride | 20 | 10 | 9.7±0.85 | 9.9±0.89 | 10.4±0.94 | 10.2±1.02 | 7.2 |
| | 40 | 10 | 10.9±1.13 | 11.6±0.98 | 12.1±1.34 | 11.9±1.15 | 11.1 |
| | 80 | 10 | 13.2±1.40 | 13.6±0.90 | 14.1±0.77 | 14.3±0.59 | 8.3 |

TABLE VI

Analgesic action in the rat—oedema-affected paw

| Products | Dose, mg./kg. per os | Number of animals | Algogenic threshold in arbitrary units±SE | | | | Maximum increase, percent | $ED_{50}$, mg./kg. |
|---|---|---|---|---|---|---|---|---|
| | | | 30 min. before | Time in min. from the treatment at— | | | | |
| | | | | 60 min | 120 min. | 180 min. | | |
| ITF 614 | 10 | 10 | 8.2±0.33 | 10.3±0.80 | 10.6±1.03 | 9.0±0.98 | 29.2 | |
| | 20 | 20 | 6.8±0.65 | 9.2±1.14 | 8.45±0.86 | 10.6±0.90 | 55.9 | 17 |
| | 40 | 20 | 6.95±0.46 | 9.75±0.91 | 11.15±1.46 | 12.6±0.76 | 82.6 | |
| | 80 | 10 | 8.1±0.78 | 11.7±1.16 | 16.0±1.04 | 12.8±2.13 | 97.5 | |
| Fluophenamic acid | 10 | 10 | 10.9±1.72 | 11.5±1.92 | 12.2±1.57 | 12.8±1.62 | 17.4 | |
| | 20 | 10 | 10.4±0.73 | 14.9±1.90 | 15.5±1.68 | 15.4±1.79 | 50.0 | 18.3 |
| | 40 | 10 | 8.8±1.20 | 14.8±2.54 | 16.8±1.18 | 13.1±0.82 | 91.0 | |
| Benzidamine hydrochloride | 20 | 10 | 7.6±1.24 | 8.6±1.07 | 8.5±0.94 | 7.8±0.69 | 13.1 | |
| | 40 | 10 | 8.5±0.71 | 9.3±0.35 | 10.4±0.80 | 11.2±1.21 | 31.7 | 56 |
| | 80 | 10 | 6.9±1.10 | 9.8±0.94 | 11.6±1.09 | 11.4±1.23 | 68.1 | |

From the data of Tables V and VI, a particularly striking analgesic action of ITF 614 can be seen.

The animals, fed with food or water at will, were kept in an environment thermostated at 21–22° C.

TABLE VII.—EFFECTS ON THE BEHAVIOR OF THE MOUSE

| Products | Dose, mg./kg. per os | Spont. activ. | Passiv. | Resp. to ache | Tremor | Convulsion | Ataxia | Straight refl. | Muscular tone | Resp. rate | Palp. opening | Mortality rate Immediate | Delayed |
|---|---|---|---|---|---|---|---|---|---|---|---|---|---|
| ITF 614 | 100 | −1 | +2 | −2 | 0 | 0 | 0 | −3 | −1 | 0 | −1 | 0/5 | 0/5 |
| | 300 | −1 | +2 | −2 | 0 | 0 | 0 | −3 | −1 | 0 | −1 | 0/5 | 0/5 |
| | 600 | −2 | +3 | −2 | 0 | 0 | 0 | −3 | −2 | −2 | −2 | 0/5 | 2/5 |
| | 1,000 | −3 | +4 | −2 | 0 | +1 | 0 | −4 | −3 | −2 | −3 | 0/5 | 5/5 |
| Fluophenamic acid | 100 | −1 | +1 | −1 | 0 | 0 | 0 | −2 | −1 | 0 | 0 | 0/5 | 0/5 |
| | 300 | −3 | +2 | −2 | 0 | 0 | 0 | −3 | −1 | −2 | 0 | 1/5 | 0/5 |
| | 600 | −3 | +4 | −4 | +1 | 0 | +3 | −4 | −2 | −3 | 0 | 1/5 | 1/5 |
| | 1,000 | −4 | +4 | −4 | +1 | 0 | +3 | −4 | −3 | −3 | 0 | 4/5 | 0/5 |
| Benzidamine hydrochloride | 30 | 0 | 0 | −1 | 0 | 0 | 0 | −2 | 0 | 0 | 0 | 0/5 | 0/5 |
| | 60 | 0 | +1 | −2 | 0 | 0 | 0 | −3 | 0 | 0 | 0 | 0/5 | 0/5 |
| | 100 | −1 | +1 | −3 | +1 | 0 | +1 | −3 | −1 | 0 | 0 | 0/5 | 0/5 |
| | 300 | −4 | +3 | −3 | +2 | +4 | +3 | −3 | | 0 | 0 | 1/5 | 0/5 |
| | 600 | | | | +2 | +4 | +4 | −4 | | 0 | 0 | 3/5 | 0/5 |
| | 1,000 | | | | | | | | | 0 | 0 | 5/5 | 0/5 |

Code:
  −1=slight decrease.
  −2=moderate decrease.
  −3=large decrease.
  −4=extreme decrease.
  +1=slight increase.
  +2=moderate increase.
  +3=large increase.
  +4=very large increase.
  0=no noticeable effects.

In addition to the above experiments which refer to "acute" tests, further tests were carried out to determine the "chronic" characteristics of the drug in question.

Thus, a test was carried out on the oedema induced by injecting carrageenin in the plantar zone of the rear paw of rats, as described by Winter et al., Proc. Soc. Exp. Biol., 111, 544, New York (1962).

Furthermore, the effect of the drug was evaluated on the arthritis produced by injecting Freund's adjuvant in accordance with the method described by Stoerk et al., in Am. J. Path., 30, 616 (1954) and then modified by Pearson [Proc. Soc. Exp. Biol., 91, 95 (1956) and Arthr. and Rheum., 4, 440 (1959)].

To complete the pattern of analogies with the rheumatoid arthritis in human beings, the modification of the erythrosedimentation rate which has been found after a Freund's adjuvant injection [Boll. Soc. Ital. Biol. Sper., 45, 36 (1969)] should be considered in addition.

While a measure of the volume of the paw both before an after the carrageenin injection is sufficient for evaluating the development of the carrageenin-induced oedema, which is localized in the paw wherein the injection has been effected, suitable parameters must be chosen in order to permit that the most reliable evaluation of the complex syndrome induced by injecting the Freund's adjuvant is carried out, which parameters should also be compatible with a reasonable time and energy expense.

Any variations of said parameters should be quantitatively measurable so that a statistic evaluation can be effected, if desired.

The following parameters have been measured: the volume of the leg injected with a mycobacteria emulsion; the volume of the contralateral leg; the functionality of the four legs; the syndrome intensity as expressed in an arbitrary, although well coded scale; and the erythrosedimentation rate.

As a further complementary parameter, the increase of the animal corporeal weight has been measured, in order to prevent overdosages of the substances and to exclude the possibility that the observed effects could be anyhow ascribed to a possible toxic action.

MATERIALS AND METHODS (a) Carrageenin-induced oedema in the rat

Female rats having corporeal weights of from 150 to 170 g., which had been kept fasting for 18 hours, were used.

The products to be tested were administered orally 1 hour before the intraplantar injection of 0.1 ml. of a 1% carrageenin aqueous solution.

The plethismographic determination of the paw volume was effected immediately after, and 1, 2, 3 and 4 hours after the injection of the phlogogenic agent. The volume increase of the paw in the control rats was compared with that of the treated rats.

The dose effective for inhibiting 50% of the oedema occurrence was determined graphically.

At least three dose levels were investigated for each product and at least ten rats were used for each dose level.

(b) Arthritis induced by Freund's adjuvant in the rat

The tests were performed on female Wistar-strain rats having an initial weight of from 140 to 160 g.

Each group of animals which was treated with the substances to be tested comprised 8 rats; in addition, a further group of 8 untreated rats was used, which rats had been injected with the Freund's adjuvant; and one more group of untreated animals was used, i.e. animals which had been injected with only the carrier used for preparing the mycobacteria suspension.

The products to be tested were administered orally through a gastric probe, in the form of a suspension in a 0.25% 65/4000 DG Methocel solution.

The arthritic syndrome was induced by intraplantarily injecting the animals with 0.1 ml. of a fine suspension of killed and dried mixed PN, DT and C strains of the human *Mycobacterium tuberculosis*. Said suspension was prepared in paraffin oil at the concentration of 5 mg./ volumes of the injected paw and of the contralateral paw. The treatments with the substances to be tested started the day before the injection of the Freund's adjuvant and were continued throughout the test period (to a total of 31 days) at a rate of 6 administrations per week. The volumes of the injected paw and of the contralateral paw, the functionality of the four paws, the intensity of the syndrome (recorded in an arbitrary scale) and the corporeal weight were measured the day before the injection of the Freund's adjuvant, the next day and the third day after the said injection, then, for the remaining test period, twice a week, that is on Tuesday and on Friday.

The erythrosedimentation rate was determined on blood samples drawn from the tail after 14 and 31 days of the treatment.

The volumes of the right and left paws were measured with the Differential Volume Gauge produced by the firm Basile (Milan, Italy).

The paw functionality was determined by placing the rats, one at a time, on a vertically disposed net having 3 x 3 mm. meshes and recording the number of the paws used by each animal to hold on to the net by correctly moving the toes. For normal animals, this value is four; for animals which badly move their paws, this value goes down to reach zero when the animal badly moves all the four paws.

The seriousness of the syndrome was expressed in values from zero to four representing a global, subjective judgment.

The rating was as follows:

0—no effects, except that on the injected leg;
1—*slight* swelling of the contralateral leg also;
2—*large* swelling of the contralateral leg also;
3—swelling of the *fore* legs also;
4—swelling of the fore legs, the tail and, sometimes, the muzzle and the ears.

The determination of the erythrosedimentation rate was effected on small blood samples by using Wintrobe capillary tubes, the blood coagulation having been prevented by the addition of Choay heparin (0.04 ml. heparin solution at a concentration of 5000 i.u./ml. added to 0.20 ml. blood); the rate was expressed in mm./120 minutes.

The results of the above described tests were summarized in the following tables.

TABLE VIII

Freund's adjuvant-injected paw. Average volume increase in ml.±SE. Data of each test grouped

| Products | Dose, mg./kg., os | Days from the starting of the administrations | | | | | | | | | |
|---|---|---|---|---|---|---|---|---|---|---|---|
| | | 3 | 5 | 8 | 11 | 14 | 17 | 21 | 24 | 28 | 31 |
| Fluophenamic acid | 10 | 1.006 ±0.072 | 1.012 ±0.065 | 1.044 ±0.087 | 0.912 ±0.093 | 1.175 ±0.091 | 1.412 ±0.134 | 1.537 ±0.142 | 1.462 ±0.171 | 1.581 ±0.242 | 1.337 ±0.203 |
| ITF 614 | 10 | 0.931 ±0.086 | 1.118 ±0.169 | 1.106 ±0.127 | 1.187 ±0.097 | 1.606 ±0.127 | 1.931 ±0.192 | 2.237 ±0.206 | 2.225 ±0.218 | 2.306 ±0.222 | 2.293 ±0.231 |
| Control, adjuvant | | 1.068 ±0.077 | 1.593 ±0.210 | 1.568 ±0.260 | 1.331 ±0.173 | 1.718 ±0.215 | 2.118 ±0.262 | 2.631 ±0.273 | 2.568 ±0.254 | 2.462 ±0.298 | 2.300 ±0.322 |

TABLE VIII—Continued

| Products | Dose, mg./kg., os | Days from the starting of the administrations | | | | | | | | | |
|---|---|---|---|---|---|---|---|---|---|---|---|
| | | 3 | 5 | 8 | 11 | 14 | 17 | 21 | 24 | 28 | 31 |
| Control, paraffin oil | | 0.175 ±0.014 | 0.300 ±0.020 | 0.250 ±0.030 | 0.233 ±0.020 | 0.375 ±0.024 | 0.283 ±0.001 | 0.391 ±0.022 | 0.283 ±0.030 | 0.266 ±0.030 | 0.308 ±0.028 |
| ITF 614 | 20 | 0.993 ±0.071 | 1.325 ±0.105 | 1.587 ±0.230 | 1.406 ±0.185 | 1.618 ±0.191 | 1.950 ±0.226 | 2.562 ±0.262 | 2.706 ±0.294 | 2.912 ±0.342 | 2.831 ±0.349 |
| ITF 614 | 40 | 1.050 ±0.040 | 1.425 ±0.088 | 1.568 ±0.183 | 1.306 ±0.145 | 1.668 ±0.170 | 1.787 ±0.160 | 2.312 ±0.203 | 2.387 ±0.220 | 2.531 ±0.252 | 2.568 ±0.278 |
| Control, adjuvant | | 0.993 ±0.047 | 1.387 ±0.096 | 1.325 ±0.132 | 1.162 ±0.120 | 1.343 ±0.145 | 1.768 ±0.158 | 2.156 ±0.180 | 2.200 ±0.226 | 2.625 ±0.246 | 2.650 ±0.267 |
| Control, paraffin oil | | 0.158 ±0.020 | 0.208 ±0.030 | 0.300 ±0.046 | 0.200 ±0.025 | 0.191 ±0.020 | 0.283 ±0.033 | 0.250 ±0.022 | 0.266 ±0.016 | 0.325 ±0.030 | 0.233 ±0.021 |
| Fluophenamic acid | 20 | 0.812 ±0.081 | 0.768 ±0.033 | 0.743 ±0.069 | 0.668 ±0.055 | 0.725 ±0.094 | 0.825 ±0.112 | 1.218 ±0.130 | 1.243 ±0.241 | 1.150 ±0.149 | 1.181 ±0.151 |
| Do | 40 | 0.881 ±0.055 | 0.756 ±0.045 | 0.706 ±0.054 | 0.675 ±0.062 | 0.843 ±0.090 | 0.887 ±0.075 | 0.131 ±0.122 | 0.993 ±0.059 | 1.131 ±0.057 | 1.100 ±0.072 |
| Control, adjuvant | | 1.031 ±0.059 | 0.887 ±0.096 | 0.756 ±0.094 | 0.681 ±0.081 | 0.850 ±0.160 | 1.318 ±0.226 | 1.893 ±0.088 | 2.018 ±0.180 | 2.481 ±0.165 | 2.593 ±0.161 |
| Control, paraffin oil | | 0.116 ±0.033 | 0.141 ±0.015 | 0.233 ±0.045 | 0.200 ±0.028 | 0.225 ±0.011 | 0.225 ±0.038 | 0.366 ±0.040 | 0.483 ±0.016 | 0.483 ±0.055 | 0.491 ±0.035 |
| Mephenamic acid | 40 | 0.781 ±0.075 | 0.987 ±0.114 | 0.968 ±0.117 | 0.918 ±0.153 | 1.231 ±0.167 | 1.237 ±0.175 | 1.662 ±0.239 | 1.712 ±0.230 | 1.893 ±0.238 | 1.850 ±0.204 |
| Do | 80 | 0.887 ±0.051 | 0.975 ±0.066 | 1.068 ±0.087 | 0.981 ±0.091 | 1.137 ±0.116 | 1.081 ±0.128 | 1.475 ±0.161 | 1.718 ±0.178 | 1.925 ±0.198 | 1.756 ±0.221 |
| Control, adjuvant | | 1.031 ±0.049 | 1.331 ±0.073 | 0.837 ±0.058 | 0.806 ±0.054 | 0.987 ±0.100 | 1.337 ±0.123 | 2.000 ±0.187 | 2.387 ±0.126 | 2.481 ±0.121 | 2.518 ±0.206 |
| Control, paraffin oil | | 0.141 ±0.015 | 0.166 ±0.033 | 0.075 ±0.030 | 0.183 ±0.024 | 0.183 ±0.030 | 0.150 ±0.034 | 0.150 ±0.054 | 0.191 ±0.047 | 0.266 ±0.061 | 0.158 ±0.041 |

TABLE IX

Contralateral paw to that injected with the Freund's adjuvant. Average volume increase in ml.±SE. Data of each test grouped

| Products | Dose, mg./kg., os | Days from the starting of the administrations | | | | | | | | | |
|---|---|---|---|---|---|---|---|---|---|---|---|
| | | 3 | 5 | 8 | 11 | 14 | 17 | 21 | 24 | 28 | 31 |
| Fluophenamic acid | 10 | 0.012 ±0.008 | 0.068 ±0.018 | 0.187 ±0.020 | 0.118 ±0.020 | 0.225 ±0.055 | 0.312 ±0.071 | 0.431 ±0.081 | 0.362 ±0.068 | 0.500 ±0.111 | 0.431 ±0.089 |
| ITF 614 | 10 | 0.018 ±0.016 | 0.100 ±0.032 | 0.243 ±0.060 | 0.156 ±0.027 | 0.325 ±0.110 | 0.400 ±0.163 | 0.781 ±0.172 | 0.818 ±0.200 | 0.825 ±0.230 | 0.881 ±0.232 |
| Control, adjuvant | | 0.006 ±0.011 | 0.062 ±0.018 | 0.106 ±0.017 | 0.350 ±0.105 | 0.521 ±0.142 | 0.731 ±0.205 | 0.600 ±0.175 | 0.850 ±0.160 | 0.887 ±0.190 | 0.787 ±0.171 |
| Control, paraffin oil | | 0.050 ±0.012 | 0.091 ±0.023 | 0.108 ±0.015 | 0.050 ±0.028 | 0.200 ±0.031 | 0.158 ±0.035 | 0.183 ±0.024 | 0.108 ±0.023 | 0.066 ±0.038 | 0.091 ±0.030 |
| ITF 614 | 20 | 0.068 ±0.011 | 0.068 ±0.013 | 0.118 ±0.023 | 0.100 ±0.021 | 0.318 ±0.071 | 0.431 ±0.094 | 0.612 ±0.132 | 0.593 ±0.112 | 0.681 ±0.156 | 0.650 ±0.185 |
| ITF 614 | 40 | 0.056 ±0.014 | 0.025 ±0.009 | 0.131 ±0.016 | 0.087 ±0.018 | 0.368 ±0.109 | 0.262 ±0.066 | 0.637 ±0.080 | 0.568 ±0.044 | 0.737 ±0.109 | 0.731 ±0.088 |
| Control adjuvant | | 0.025 ±0.013 | 0.075 ±0.009 | 0.131 ±0.009 | 0.187 ±0.047 | 0.387 ±0.093 | 0.593 ±0.122 | 0.856 ±0.160 | 0.881 ±0.192 | 1.168 ±0.257 | 1.281 ±0.307 |
| Control, no treatment | | 0.033 ±0.016 | 0.050 ±0.025 | 0.091 ±0.023 | 0.050 ±0.012 | 0.058 ±0.015 | 0.150 ±0.012 | 0.091 ±0.027 | 0.091 ±0.020 | 0.183 ±0.021 | 0.100 ±0.025 |
| Fluophenamic acid | 20 | 0.187 ±0.252 | 0.025 ±0.026 | 0.006 ±0.011 | 0.037 ±0.012 | 0.118 ±0.043 | 0.168 ±0.055 | 0.518 ±0.077 | 0.418 ±0.084 | 0.568 ±0.104 | 0.556 ±0.062 |
| Do | 40 | 0.043 ±0.044 | 0.000 ±0.018 | 0.018 ±0.028 | 0.031 ±0.016 | 0.156 ±0.061 | 0.231 ±0.045 | 0.481 ±0.093 | 0.400 ±0.056 | 0.512 ±0.071 | 0.537 ±0.061 |
| Control, adjuvant | | 0.043 ±0.041 | 0.012 ±0.024 | 0.025 ±0.029 | 0.081 ±0.016 | 0.256 ±0.070 | 0.581 ±0.173 | 1.087 ±0.226 | 1.262 ±0.292 | 1.625 ±0.381 | 1.631 ±0.382 |
| Control, paraffin oil | | 0.011 ±0.045 | 0.008 ±0.023 | 0.001 ±0.049 | 0.050 ±0.031 | 0.108 ±0.023 | 0.125 ±0.024 | 0.266 ±0.016 | 0.283 ±0.016 | 0.325 ±0.046 | 0.300 ±0.018 |
| Mephenamic acid | 40 | 0.006 ±0.006 | 0.025 ±0.009 | 0.018 ±0.013 | 0.081 ±0.028 | 0.175 ±0.068 | 0.275 ±0.106 | 0.475 ±0.159 | 0.518 ±0.155 | 0.756 ±0.219 | 0.618 ±0.156 |
| Do | 80 | 0.000 ±0.094 | 0.187 ±0.016 | 0.054 ±0.023 | 0.093 ±0.030 | 0.125 ±0.037 | 0.137 ±0.049 | 0.331 ±0.090 | 0.418 ±0.093 | 0.618 ±0.134 | 0.500 ±0.130 |
| Control, adjuvant | | 0.018 ±0.009 | 0.018 ±0.015 | 0.000 ±0.031 | 0.068 ±0.016 | 0.087 ±0.020 | 0.243 ±0.046 | 0.362 ±0.170 | 0.806 ±0.190 | 1.143 ±0.174 | 1.043 ±0.175 |
| Control, paraffin oil | | 0.008 ±0.006 | 0.016 ±0.021 | 0.075 ±0.024 | 0.008 ±0.020 | 0.025 ±0.017 | 0.041 ±0.023 | 0.008 ±0.023 | 0.133 ±0.038 | 0.158 ±0.020 | 0.050 ±0.025 |

TABLE X

Functionality of the legs—average values±SE (legs used to hold to the vertically disposed net)

| Products | Dose, mg./kg., os | Days from the starting of the administrations ||||||||||
|---|---|---|---|---|---|---|---|---|---|---|---|
| | | 3 | 5 | 8 | 11 | 14 | 17 | 21 | 24 | 28 | 31 |
| Fluophenamic acid | 10 | 3.250 ±0.163 | 3.375 ±0.182 | 3.250 ±0.163 | 3.625 ±0.182 | 3.125 ±0.226 | 2.750 ±0.163 | 2.875 ±0.226 | 0.750 ±0.249 | 2.625 ±0.182 | 2.625 ±0.182 |
| ITF 614 | 10 | 3.625 ±0.182 | 3.625 ±0.182 | 3.375 ±0.182 | 3.375 ±0.263 | 2.025 ±0.263 | 2.500 ±0.378 | 2.250 ±0.366 | 2.125 ±0.350 | 2.000 ±0.377 | 2.125 ±0.295 |
| Control, adjuvant | | 3.125 ±0.125 | 3.125 ±0.125 | 3.125 ±0.125 | 2.750 ±0.249 | 2.500 ±0.422 | 2.125 ±0.350 | 2.000 ±0.327 | 1.750 ±0.313 | 1.750 ±0.412 | 2.000 ±0.327 |
| Control, paraffin oil | | 4.000 ±0.000 | 4.000 ±0.000 | 4.000 ±0.000 | 4.000 ±0.000 | 4.000 ±0.000 | 4.000 ±0.000 | 4.000 ±0.000 | 4.000 ±0.000 | 4.000 ±0.000 | 4.000 ±0.000 |
| ITF 614 | 20 | 3.125 ±0.125 | 3.000 ±0.000 | 3.375 ±0.182 | 3.375 ±0.182 | 3.250 ±0.163 | 2.625 ±0.182 | 2.000 ±0.267 | 2.125 ±0.226 | 2.250 ±0.249 | 2.375 ±0.263 |
| ITF 614 | 40 | 3.125 ±0.125 | 3.000 ±0.000 | 3.250 ±0.163 | 3.375 ±0.182 | 2.875 ±0.125 | 2.750 ±0.163 | 2.375 ±0.183 | 2.375 ±0.183 | 2.375 ±0.183 | 2.375 ±0.183 |
| Control, adjuvant | | 3.125 ±0.125 | 3.000 ±0.000 | 3.125 ±0.125 | 3.250 ±0.163 | 2.500 ±0.422 | 2.125 ±0.350 | 1.875 ±0.295 | 1.625 ±0.323 | 1.875 ±0.350 | 1.875 ±0.398 |
| Control, paraffin oil | | 4.000 ±0.000 | 4.000 ±0.000 | 4.000 ±0.000 | 4.000 ±0.000 | 4.000 ±0.000 | 4.000 ±0.000 | 4.000 ±0.000 | 4.000 ±0.000 | 4.000 ±0.000 | 4.000 ±0.000 |
| Fluophenamic acid | 20 | 3.500 ±0.189 | 3.625 ±0.182 | 3.750 ±0.163 | 3.875 ±0.125 | 3.875 ±0.125 | 3.125 ±0.226 | 2.750 ±0.193 | 2.625 ±0.182 | 2.750 ±0.313 | 2.500 ±0.189 |
| Do | 40 | 3.750 ±0.163 | 3.750 ±0.163 | 3.750 ±0.163 | 3.875 ±0.125 | 3.625 ±0.263 | 3.000 ±0.267 | 2.625 ±0.460 | 2.625 ±0.420 | 2.625 ±0.375 | 2.625 ±0.375 |
| Control, adjuvant | | 3.250 ±0.163 | 3.250 ±0.163 | 3.625 ±0.182 | 3.750 ±0.163 | 3.375 ±0.324 | 1.875 ±0.515 | 1.375 ±0.420 | 1.375 ±0.460 | 1.250 ±0.453 | 1.250 ±0.453 |
| Control, paraffin oil | | 4.000 ±0.000 | 4.000 ±0.000 | 4.000 ±0.000 | 4.000 ±0.000 | 4.000 ±0.000 | 4.000 ±0.000 | 4.000 ±0.000 | 4.000 ±0.000 | 4.000 ±0.000 | 4.000 ±0.000 |
| Mephenamic acid | 40 | 3.250 ±0.163 | 3.375 ±0.182 | 3.500 ±0.189 | 3.625 ±0.182 | 3.125 ±0.226 | 3.750 ±0.410 | 2.500 ±0.378 | 2.500 ±0.378 | 2.125 ±0.398 | 1.750 ±0.313 |
| Do | 80 | 3.250 ±0.163 | 3.625 ±0.182 | 3.625 ±0.182 | 3.625 ±0.182 | 3.375 ±0.182 | 3.000 ±0.189 | 2.625 ±0.182 | 2.250 ±0.366 | 2.375 ±0.263 | 2.000 ±0.267 |
| Control, adjuvant | | 3.125 ±0.125 | 3.125 ±0.125 | 3.625 ±0.182 | 3.625 ±0.182 | 3.000 ±0.189 | 2.875 ±0.226 | 2.000 ±0.378 | 1.875 ±0.350 | 1.250 ±0.412 | 1.250 ±0.313 |
| Control, paraffin oil | | 4.000 ±0.000 | 4.000 ±0.000 | 4.000 ±0.000 | 4.000 ±0.000 | 4.000 ±0.000 | 4.000 ±0.000 | 4.000 ±0.000 | 4.000 ±0.000 | 4.000 ±0.000 | 4.000 ±0.000 |

TABLE XI

Intensity of the syndrome—average values ± SE

| Products | Dose, mg./kg., os | Days from the starting of the administrations ||||||||||
|---|---|---|---|---|---|---|---|---|---|---|---|
| | | 3 | 5 | 8 | 11 | 14 | 17 | 21 | 24 | 28 | 31 |
| Fluophenamic acid | 10 | 0.000 ±0.000 | 0.000 ±0.000 | 0.000 ±0.000 | 0.125 ±0.124 | 0.250 ±0.163 | 0.625 ±0.323 | 1.000 ±0.377 | 1.250 ±0.453 | 1.125 ±0.350 | 1.125 ±0.398 |
| ITF 614 | 10 | 0.000 ±0.000 | 0.000 ±0.000 | 0.250 ±0.163 | 0.500 ±0.267 | 0.750 ±0.412 | 1.125 ±0.479 | 2.000 ±0.463 | 2.125 ±0.549 | 2.125 ±0.475 | 2.125 ±0.549 |
| Control, adjuvant | | 0.000 ±0.000 | 0.000 ±0.000 | 0.125 ±0.124 | 0.875 ±0.350 | 1.375 ±0.497 | 1.750 ±0.559 | 2.000 ±0.499 | 2.250 ±0.559 | 2.375 ±0.595 | 2.500 ±0.534 |
| Control, paraffin oil | | 0.000 ±0.000 | 0.000 ±0.000 | 0.000 ±0.000 | 0.000 ±0.000 | 0.000 ±0.000 | 0.000 ±0.000 | 0.000 ±0.000 | 0.000 ±0.000 | 0.000 ±0.000 | 0.000 ±0.000 |
| ITF 614 | 20 | 0.000 ±0.000 | 0.000 ±0.000 | 0.000 ±0.000 | 0.000 ±0.000 | 0.750 ±0.313 | 1.750 ±0.491 | 2.375 ±0.497 | 2.000 ±0.422 | 2.500 ±0.499 | 1.875 ±0.479 |
| ITF 614 | 40 | 0.000 ±0.000 | 0.000 ±0.000 | 0.000 ±0.000 | 0.000 ±0.000 | 0.750 ±0.313 | 0.875 ±0.479 | 1.750 ±0.412 | 2.125 ±0.125 | 2.375 ±0.323 | 2.000 ±0.267 |
| Control, adjuvant | | 0.000 ±0.000 | 0.000 ±0.000 | 0.000 ±0.000 | 0.500 ±0.189 | 1.000 ±0.490 | 1.750 ±0.491 | 2.750 ±0.497 | 2.625 ±0.491 | 2.875 ±0.398 | 2.875 ±0.350 |
| Control, paraffin oil | | 0.000 ±0.000 | 0.000 ±0.000 | 0.000 ±0.000 | 0.000 ±0.000 | 0.000 ±0.000 | 0.000 ±0.000 | 0.000 ±0.000 | 0.000 ±0.000 | 0.000 ±0.000 | 0.000 ±0.000 |
| Fluophenamic acid | 20 | 0.000 ±0.000 | 0.000 ±0.000 | 0.000 ±0.000 | 0.000 ±0.000 | 0.375 ±0.263 | 1.250 ±0.453 | 1.250 ±0.453 | 1.875 ±0.580 | 1.875 ±0.580 | 2.000 ±0.534 |
| Do | 40 | 0.000 ±0.000 | 0.000 ±0.000 | 0.000 ±0.000 | 0.000 ±0.000 | 0.500 ±0.327 | 1.250 ±0.422 | 1.500 ±0.463 | 1.375 ±0.420 | 1.500 ±0.500 | 1.375 ±0.420 |
| Control, adjuvant | | 0.000 ±0.000 | 0.000 ±0.000 | 0.000 ±0.000 | 0.000 ±0.000 | 1.125 ±0.479 | 2.000 ±0.534 | 2.625 ±0.460 | 2.875 ±0.295 | 2.875 ±0.295 | 2.875 ±0.226 |
| Control, paraffin oil | | 0.000 ±0.000 | 0.000 ±0.000 | 0.000 ±0.000 | 0.000 ±0.000 | 0.000 ±0.000 | 0.000 ±0.000 | 0.000 ±0.000 | 0.000 ±0.000 | 0.000 ±0.000 | 0.000 ±0.000 |
| Mephenamic acid | 40 | 0.000 ±0.000 | 0.000 ±0.000 | 0.000 ±0.000 | 0.000 ±0.000 | 0.875 ±0.580 | 1.125 ±0.639 | 1.500 ±0.567 | 1.875 ±0.580 | 2.125 ±0.515 | 2.375 ±0.460 |
| Do | 80 | 0.000 ±0.000 | 0.000 ±0.000 | 0.000 ±0.000 | 0.000 ±0.000 | 0.125 ±1.124 | 0.500 ±0.189 | 0.870 ±0.398 | 1.750 ±0.526 | 2.000 ±0.626 | 2.000 ±0.534 |
| Control, adjuvant | | 0.000 ±0.000 | 0.000 ±0.000 | 0.000 ±0.000 | 0.125 ±0.124 | 0.500 ±0.267 | 1.000 ±0.378 | 1.625 ±0.532 | 2.500 ±0.534 | 2.875 ±0.350 | 3.250 ±0.313 |
| Control, paraffin oil | | 0.000 ±0.000 | 0.000 ±0.000 | 0.000 ±0.000 | 0.000 ±0.000 | 0.000 ±0.000 | 0.000 ±0.000 | 0.000 ±0.000 | 0.000 ±0.000 | 0.000 ±0.000 | 0.000 ±0.000 |

TABLE XII

ERYTHROSEDIMENTATION RATE. AVERAGE VALUES ±SE IN MM./120 MIN.

| Products | Dose, mg./kg., os | Days from the starting of the administrations | |
|---|---|---|---|
| | | 14 | 31 |
| Fluophenamic acid | 10 | 4.500±0.364 | 3.875±0.588 |
| ITF 614 | 10 | 5.625±1.723 | 6.625±1.703 |
| Control, adjuvant | | 6.750±1.457 | 8.375±1.444 |
| Control, paraffin oil | | 1.666±0.4777 | 2.000±0.483 |
| ITF 614 | 20 | 5.312±0.801 | 5.875±0.929 |
| ITF 614 | 40 | 4.312±0.968 | 3.000±0.526 |
| Control, adjuvant | | 4.937±0.512 | 7.375±1.368 |
| Control, paraffin oil | | 2.250±0.602 | 1.916±0.416 |
| Fluophenamic acid | 20 | 6.062±2.755 | 3.437±0.394 |
| Do | 40 | 3.250±0.796 | 2.437±0.512 |
| Control, adjuvant | | 8.437±2.051 | 14.250±4.250 |
| Control, paraffin oil | | 2.083±0.436 | 2.916±0.436 |
| Mephenamic acid | 40 | 2.625±0.479 | 5.000±0.597 |
| Do | 80 | 2.437±0.764 | 4.437±0.671 |
| Control, adjuvant | | 4.312±1.105 | 10.062±1.643 |
| Control, paraffin oil | | 2.166±0.601 | 1.916±0.374 |

TABLE XIII

Average corporeal weight increase in g.±SE. Data of each test grouped

| Products | Dose, mg./kg., os | Days from the starting of the administrations | | | | | | | | | |
|---|---|---|---|---|---|---|---|---|---|---|---|
| | | 3 | 5 | 8 | 11 | 14 | 17 | 21 | 24 | 28 | 31 |
| Fluophenamic acid | 10 | 1.875 ±1.315 | 0.625 ±1.751 | 8.125 ±2.662 | 11.875 ±2.488 | 11.875 ±0.365 | 11.875 ±4.425 | 15.625 ±5.126 | 10.625 ±5.545 | 15.623 ±4.765 | 21.875 ±3.888 |
| ITF 614 | 10 | 2.500 ±1.636 | 1.875 ±1.315 | 8.750 ±1.250 | 9.375 ±2.203 | 11.250 ±1.570 | 8.750 ±2.930 | 3.750 ±7.118 | 2.500 ±9.496 | 4.375 ±9.839 | 10.625 ±10.108 |
| Control, adjuvant | | 3.125 ±1.875 | 1.250 ±2.059 | 6.875 ±3.398 | 4.375 ±4.475 | 4.375 ±5.213 | 3.750 ±5.324 | 2.125 ±5.340 | 3.125 ±4.323 | 11.250 ±4.605 | 12.500 ±4.432 |
| Control, paraffin oil | | 7.500 ±2.813 | 12.500 ±3.095 | 23.333 ±3.333 | 31.666 ±5.725 | 38.333 ±5.426 | 40.833 ±5.688 | 46.666 ±6.412 | 50.000 ±5.773 | 54.166 ±4.362 | 55.833 ±4.549 |
| ITF 614 | 20 | 6.250 ±1.250 | 7.500 ±1.889 | 12.500 ±1.336 | 17.500 ±1.636 | 10.625 ±1.990 | 5.000 ±3.535 | 1.250 ±4.199 | 1.250 ±3.503 | 1.875 ±4.994 | 3.750 ±4.605 |
| ITF 614 | 40 | 5.625 ±1.752 | 7.500 ±1.636 | 9.375 ±2.903 | 16.250 ±3.629 | 11.250 ±5.649 | 11.875 ±6.875 | 5.000 ±5.824 | 2.500 ±5.088 | 8.125 ±5.504 | 10.000 ±6.196 |
| Control, adjuvant | | 6.250 ±0.818 | 6.675 ±0.915 | 6.256 ±1.567 | 11.000 ±2.672 | 9.373 ±3.195 | 9.375 ±3.463 | 1.875 ±2.662 | 3.750 ±3.867 | 1.875 ±3.083 | 1.250 ±4.605 |
| Control, paraffin oil | | 9.166 ±1.536 | 10.833 ±0.818 | 13.333 ±2.168 | 17.500 ±2.815 | 25.000 ±2.582 | 28.333 ±3.073 | 33.333 ±3.333 | 34.166 ±3.745 | 37.500 ±4.609 | 38.333 ±4.772 |
| Fluophenamic acid | 20 | 2.500 ±0.945 | 4.375 ±0.625 | 15.000 ±1.889 | 25.625 ±3.195 | 33.125 ±2.489 | 33.125 ±2.302 | 20.000 ±6.614 | 26.250 ±6.801 | 33.750 ±6.533 | 35.000 ±6.478 |
| Do | 40 | 3.750 ±1.250 | 5.600 ±1.889 | 10.625 ±1.488 | 19.375 ±1.750 | 23.750 ±2.789 | 16.875 ±3.122 | 24.375 ±8.488 | 26.250 ±10.119 | 33.750 ±8.444 | 31.875 ±7.067 |
| Control, adjuvant | | 1.250 ±2.948 | 0.500 ±2.145 | 9.875 ±3.744 | 23.000 ±1.770 | 30.250 ±2.948 | 18.000 ±5.130 | 17.375 ±3.451 | 14.000 ±5.901 | 17.750 ±6.390 | 18.375 ±6.643 |
| Control, paraffin oil | | 3.330 ±1.666 | 2.500 ±6.854 | 16.830 ±1.533 | 21.000 ±2.879 | 41.830 ±4.733 | 48.500 ±4.616 | 61.830 ±4.366 | 67.670 ±4.767 | 66.500 ±4.956 | 65.000 ±4.726 |
| Fluophenamic acid | 40 | 4.375 ±2.203 | 0.625 ±2.203 | 13.125 ±3.265 | 20.000 ±3.273 | 16.875 ±8.070 | 18.750 ±9.624 | 18.725 ±10.561 | 21.875 ±10.729 | 25.000 ±11.840 | 24.375 ±10.915 |
| Do | 80 | 1.875 ±2.979 | 0.625 ±2.577 | 12.500 ±5.669 | 14.375 ±6.009 | 23.750 ±0.224 | 15.000 ±9.633 | 13.125 ±6.748 | 13.125 ±5.340 | 11.875 ±6.181 | 13.125 ±5.820 |
| Control, adjuvant | | 1.250 ±1.250 | 1.875 ±2.099 | 10.000 ±1.543 | 13.750 ±1.567 | 18.125 ±3.888 | 20.000 ±4.724 | 11.250 ±6.250 | 7.500 ±6.338 | 6.375 ±5.781 | 3.750 ±6.461 |
| Control, paraffin oil | | 11.666 ±2.472 | 9.166 ±2.386 | 17.500 ±3.594 | 23.330 ±4.014 | 34.166 ±3.270 | 43.333 ±3.800 | 49.166 ±5.069 | 51.666 ±5.270 | 54.166 ±6.508 | 56.666 ±4.216 |

The global activity indexes are shown in the following Table XV.

TABLE XV

Global activity indexes

| Products | Dose, mg./kg., os | Volume of— | | Percent inhibition on— | | | Activity index |
|---|---|---|---|---|---|---|---|
| | | The injected paw | The contralateral paw | Leg functionality | Syndrome intensity | Erythrosedimentation rate | |
| Mephenamic acid | 40 | 17.6 | 31.3 | 19.3 | 16.8 | 65.5 | 150.5 |
| | 80 | 19.3 | 47.6 | 28.1 | 38.9 | 72.9 | 206.8 |
| Fluophenamic acid | 10 | 41.7 | 59.4 | 38.1 | 58.5 | 58.9 | 256.6 |
| | 20 | 44.8 | 78.7 | 51.2 | 40.0 | 74.5 | 289.2 |
| | 40 | 55.5 | 84.4 | 50.4 | 47.8 | 96.1 | 334.2 |
| ITF 614 | 10 | 14.7 | 9.5 | 21.4 | 17.0 | 25.1 | 87.7 |
| | 20 | −15.0 | 41.5 | 20.0 | 21.7 | 13.8 | 82.0 |
| | 40 | −6.5 | 42.3 | 22.4 | 31.3 | 61.4 | 150.9 |

The global activity of ITF 614 has thus been shown as strikingly more desirable than that of such drugs having very similar structures as fluophenamic acid, mephenamic acid and benzidamine.

In addition, the acute toxicity of the product of this invention has been examined in comparison with that of fluophenamic acid on male CF-1 strain mice having a weight of 18-22 g. and on male Wister-strain rats having a weight of 170-190 g. The animals were kept in a thermostated room maintained at 20-21° C. and 60-65% relative humidity.

The animals were kept fasting for 6 hours before the treatment whereas, on the contrary, they were fed with food and water at will after the treatment.

The immediate mortality rate and that which occurred during the five days after the administration were determined.

The $LD_{50}$ values and the relevant reliance limits were calculated according to Litchfield and Wilcoxon, J. Pharm. Exp. Therap., 96, 99 (1949).

The results of the toxicity tests are summarized in the following Table XVI.

TABLE XVI

| Product | $LD_{50}$ (C.L.) mg./kg. | | |
|---|---|---|---|
| | Mouse | | Rat, os |
| | I.p. | Os | |
| ITF 614 | 1,400 (1,120–1,750) | >1,000 | >1,000 |
| Fluophenamic acid | 260 (221–306) | 715 (650–788) | 440 (386–502) |

The drug of this invention can be administered both orally and parenterally. Usual pharmaceutical forms of administration are, for example, troches, tablets, pills, syrups (to be used orally) and suppositories (to be used rectally).

The daily doses are of from 300 to 700 mg. The capsules or tablets contain from 100 to 200 mg. of the drug. The same doses are used when the pharmaceutical form is a syrup or a suppository.

The following are some examples of suitable pharmaceutical compositions containing the product of this invention.

EXAMPLE 1

100 mg. tablets

| | Mg. |
|---|---|
| Product | 100 |
| Lactose | 40 |
| Methylcellulose | 15 |
| Starch | 20 |
| Magnesium stearate | 5 |

EXAMPLE 2

200 mg. tablets

| | Mg. |
|---|---|
| Product | 200 |
| Lactose | 70 |
| Methylcellulose | 20 |
| Starch | 30 |
| Magnesium stearate | 10 |

EXAMPLE 3

100 mg. capsules

| | Mg. |
|---|---|
| Product | 100 |
| Lactose | 50 |
| Starch | 5 |
| Talc | 2 |
| Magnesium stearate | 3 |

TABLE XIV

Significancy with respect to the "adjuvant" and "paraffin oil" injected controls (student's "t") at the 31st day of the treatment

| Products | Dose, mg./kg., os | Injected paw | | Control paw | | Functionality | | Seriousness of the syndrome | | Erythrosedimentation rate | | Corporeal weight | |
|---|---|---|---|---|---|---|---|---|---|---|---|---|---|
| | | Control, adjuvant | Control, paraffin | Control, adjuvant | Control, paraffin | Control, adjuvant | Control, paraffin | Control, adjuvant | Control, paraffin | Control, adjuvant | Control, paraffin | Control, adjuvant | Control, paraffin |
| Fluophenamic acid | 10 | 2.527 | 4.325 | 1.841 | 3.155 | 1.670 | 7.334 | 2.064 | 2.826 | 2.886 | 2.342 | 1.590 | 5.685 |
| ITF 614 | 10 | 0.016 | 7.315 | 0.324 | 2.893 | 0.283 | 6.355 | 0.489 | 3.870 | 0.784 | 2.279 | 0.169 | 3.638 |
| Control, paraffin oil | | 5.286 | | 3.450 | | 6.116 | | 4.681 | | 3.675 | | 6.698 | |
| ITF 614 | 20 | 0.411 | 6.357 | 1.758 | 2.527 | 1.48 | 6.178 | 1.685 | 3.914 | 0.907 | 3.471 | 0.383 | 5.128 |
| ITF 614 | 40 | 0.211 | 7.189 | 1.719 | 5.972 | 1.048 | 6.178 | 1.987 | 7.490 | 2.985 | 1.528 | 1.133 | 3.413 |
| Control, paraffin oil | | 7.719 | | 3.287 | | 5.339 | | 8.214 | | 3.338 | | 5.499 | |
| Fluophenamic acid | 20 | 6.380 | 3.849 | 2.773 | 3.415 | 2.546 | 7.936 | 1.508 | 3.745 | 2.553 | 0.880 | 1.791 | 3.501 |
| Do | 40 | 8.437 | 6.779 | 2.824 | 3.260 | 2.338 | 3.666 | 3.145 | 3.273 | 2.769 | 0.680 | 1.891 | 3.607 |
| Control, paraffin oil | | 11.018 | | 2.982 | | 6.070 | | 12.721 | | 2.279 | | 5.334 | |
| Mephenamic acid | 40 | 2.304 | 7.026 | 1.800 | 3.084 | 1.129 | 7.188 | 1.572 | 6.163 | 2.895 | 4.024 | 1.624 | 2.440 |
| Do | 80 | 2.518 | 6.123 | 2.483 | 2.925 | 1.828 | 7.490 | 2.019 | 3.745 | 3.169 | 2.981 | 1.078 | 5.665 |
| Control, paraffin oil | | 9.702 | | 4.831 | | 8.785 | | 10.383 | | 4.101 | | 6.334 | |

Note:
D. of F. = 14    $t_{0.01}$ = 2.98 (as comparison with "adjuvant" control).
D. of F. = 12    $t_{0.01}$ = 3.06 (as comparison with "paraffin oil" control).
    $t_{0.05}$ = 2.15
    $t_{0.05}$ = 2.18

EXAMPLE 4

200 mg. capsules

| | Mg. |
|---|---|
| Product | 200 |
| Lactose | 82 |
| Starch | 10 |
| Talc | 3 |
| Magnesium stearate | 5 |

EXAMPLE 5

1% suspension to be used orally

| | G. |
|---|---|
| Product | 1.0 |
| Hydroxyethylcellulose | 1.0 |
| Sucrose | 20 |
| Nipagine | 0.1 |
| Nipasol | 0.02 |
| Water, balance to 100 ml. | |

EXAMPLE 6

2% suspension to be used orally

| | G. |
|---|---|
| Product | 2.0 |
| Hydroxyethylcellulose | 1.5 |
| Sucrose | 25 |
| Nipagine | 0.1 |
| Nipasol | 0.02 |
| Water, balance to 100 ml. | |

What is claimed is:

1. A pharmaceutical composition having analgesic or antiphlogistic activities comprising an analgesic or antiphlogistic effective amount of, as the active ingredient, 1-(m - trifluoromethylphenyl)-3-hydroxy-1H-indazole of the formula

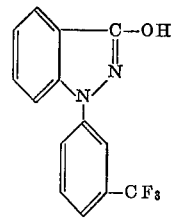

in a pharmaceutically acceptable carrier to be administered orally in the form of troche, tablet, pill, syrup, capsule, or rectally in the form of suppository.

2. The composition of claim 1 containing 100–200 milligrams of active ingredient.

3. A method for relieving pain or alleviating inflammatory syndromes in animals, which comprises administering an analgesic or antiphlogistic effective amount of the pharmaceutical composition of claim 1 to an animal in need of such treatment.

4. The method of claim 3 wherein the daily dose of active ingredient is from 300–700 milligrams.

5. The method of claim 4 wherein each individual dose contains from 100–200 milligrams of active ingredient.

References Cited

Il Farmaco, May 1970, No. 5, pp. 386–405.
Chemical Abstracts, 70:77855k (1969).

JEROME D. GOLDBERG, Primary Examiner